United States Patent

[11] 3,625,824

| [72] | Inventors | Lester E. Casida<br>State College, Pa.;<br>Donald A. Klein, Corvallis, Oreg. |
|------|-----------|---|
| [21] | Appl. No. | 66,658 |
| [22] | Filed | Aug. 24, 1970 |
| [45] | Patented | Dec. 7, 1971 |
| [73] | Assignee | Texaco Inc.<br>New York, N.Y.<br>Continuation-in-part of application Ser. No. 738,117, June 19, 1968, now abandoned.<br>This application Aug. 24, 1970, Ser. No. 66,658 |

[54] MICROBIOLOGICAL PROCESS FOR PRODUCTION OF ALKANONES
9 Claims, No Drawings

[52] U.S. Cl. .................................................. 195/28

[51] Int. Cl. ........................................ C12b 1/00
[50] Field of Search .............................. 195/3 H, 28, 47

[56] References Cited
OTHER REFERENCES

Lukins et al., J. of Bact, " Methyl Ketone Metabolism," Vol. 85, No. 5, 1963.

*Primary Examiner*—A. Louis Monacell
*Assistant Examiner*—Gary M. Nath
*Attorneys*—Thomas H. Whaley and Carl G. Ries

ABSTRACT: Alkanones are produced by growing a species of *Athrobacter*, (ATCC 21237), aerobically in an alkane-salt aqueous medium mixture containing a nonhydrocarbon carbon source. A mixture of monoalkanones are produced from a $C_{10}$–$C_{16}$ alkane.

MICROBIOLOGICAL PROCESS FOR PRODUCTION OF ALKANONES

CROSS-REFERENCE TO RELATED APPLICATION

This is a continuation-in-part of application Ser. No. 738,117, filed June 19, 1968 now abandoned.

THE BACKGROUND OF THE INVENTION

This invention relates to the microbiological production of ketones. More particularly, it relates to the production of alkanones by maintaining a species of the genus in a nutrient aqueous medium in contact with an alkane and a nonhydrocarbon carbon source together with an oxygen-containing gas under controlled conditions of temperature and pH which favor the selective oxidation.

Cooxidation microbiological processes are known. When utilizing methane as a carbon and energy source, *Pseudomonas methanica* will produce acetone and 2-butanone, respectively, from propane and butane. It is also known that certain microorganisms can oxidize the lower aliphatic hydrocarbons to their equivalent ketones. Thus, methyl ketones are produced when propane, butane, pentane, and hexane are oxidized by *Mycobacterium smegmatis*. The bacterial oxidation of alkanes, having more then 10 carbons, to their corresponding ketones has not been confirmed to date. It is known that a strain of *Pseudomonas aeruginosa* can utilize n-decane as a sole carbon source for growth and that when "washed" cells grown on this alkane are used as a replacement culture with the alkane, the corresponding ketones are formed. However, this process is nonspecific; products such as alcohols and various fatty acids are also produced.

The microbiological process of oxidizing $C_{10}$–$C_{16}$ alkanes to their corresponding alkanones would be a desirable process provided the selectively for alkanones, in general, and specific alkanones, in particular, is significantly high.

SUMMARY OF THE INVENTION

In accordance with the process of our invention, a particular strain of Arthrobacter is contacted with an aqueous nutrient solution, a $C_{10}$–$C_{16}$ alkane and nonhydrocarbon carbon source under aerobic conditions and controlled conditions of pH and temperature to produce the corresponding alkanones.

Specifically, the identification of the microorganism employed in our invention is of the genus, Arthrobacter, and is a particular strain deposited with the American Type Culture Collection, Rockville, Md. on Apr. 18, 1968 where it has been given the designation, ATCC 21237, and where it is presently available for distribution to the public without reservation, having been released for distribution without reservation as of May 1, 1970.

A mixture of alkanones is produced when a pure alkane is oxidized by the process of our invention, with the relative amounts of the individual ketones being in decreasing concentration as the distances of the reactive carbons increase from the terminal end of the alkane. The process is extremely selective since other hydrocarbon oxidation products are not observed and the ratios of the individual alkanones remain constant despite substantial variations in the nutritive conditions supplied for the organism.

The monoalkanones produced by the process of our invention have a variety of uses. For example, they can be (a) used as solvents, (b) reduced to alcohols, (c) oxidized to carboxylic acids, (d) converted to difunctional alcohols and amines via condensation with formaldehyde and (e) converted to bisphenols by reaction with phenols. These products can be used to make plasticizers, detergents and other surface active agents.

DESCRIPTION OF THE PREFERRED EMBODIMENTS

The micro-organism employed in the process of our invention for the production of alkanones is unable to utilize an alkane as its only carbon source for growth except under conditions of high aeration where only trace amounts of growth occur. Therefore, we employ a cooxidation process wherein a nonhydrocarbon is employed as the growth carbon source and combined with the alkane and salt medium. The micro-organism employed in our process is of the genus, Arthrobacter, and is a particular strain deposited with the American Type Culture Collection and designated ATCC 21237. This strain may be recovery as a random isolate after plating a Hagerstown silty clay loam soil on nutrient agar containing 0.1 glucose. Stock cultures and inoculum of this strain may also be maintained on this medium. Inoculum of this strain may be grown aerobically in a basal salt medium together with cornsteep liquor or yeast extract, such as Difco. A nutritive medium must be employed in the process of our invention and must contain a source of carbon which may be supplied by cornsteep liquor or yeast extract as well as inorganic nutrition supplied by such mineral salts as calcium chloride, magnesium sulfate, ferrous sulfate sodium nitrate and acid sulfates. Growth factors may be required but are provided by the yeast extract or cornsteep liquor. Ideally, a buffering compound should be added to the growth medium; an inorganic salt such as an acid phosphate is suitable. We have found that several of the standard salt media may be employed and to these are added the buffering agents, carbon sources and the growth factors. One such medium which we find particularly useful is set forth in table I below.

TABLE I

T-l-J Basal Salt Medium

| Component | Amount |
|---|---|
| | g./liter |
| $Na_2HPO_4$ | 0.8 |
| $KH_2PO_4$ | 0.8 |
| $MgSO_4$ | 0.2 |
| $CaCl_2$ | 0.002 |
| $FeSO_4.7H_2O$ | 0.001 |
| $NaNO_3$ | 8.0 |

Plus tap water to make a liter of medium

Alkanes which may be selectively oxidized by the process of our invention include any of the $C_{10}$–$C_{16}$ alkanes or mixtures thereof, particularly, pentadecane and hexadecane. The process is selective in that only monoketones are produced, although a mixture of ketones is obtained even when a pure alkane is employed as charge stock. The mixed monoketones are substantially the 2,3 and 4-alkanones with only a trace of 5-alkanone being produced. The individual monoalkanones are produced in decreasing quantities as the distance of the reactive carbon increases from the terminal end of the hydrocarbon, i.e., the relative yield of 2-alkanone is greater than that of 3-alkanone which in turn is greater than that of 4-alkanone.

The inoculum which is employed in the process of our invention may be grown on a 0.1 glucose-nutrient agar when only a small quantity is needed. However, for large commercial fermentors requiring substantial quantities of inoculum, a broth culture may be grown on a yeast extract-salt broth in the absence of a hydrocarbon substrate. Although many micro-organisms must be adapted to grow on hydrocarbons before being utilized, this need not be done for the micro-organsim employed in the process of our invention. Also, there is no requirement that an alkane be present in the stock culture or in the medium wherein the inoculum is being prepared; a nonhydrocarbon carbon source is usually employed.

During the fermemtation employed in the process of our invention for selectively oxidizing alkanes, certain operating conditions are preferred. For example, when the nonhydrocarbon portion of the aqueous medium is cornsteep liquor it will comprise 0.5–2.0 volume percent, preferably about 0.5 volume percent, of the aqueous phase. Alternately, if yeast extract is serving as the nonhydrocarbon carbon source it comprises about 0.5–10.0 weight percent, preferably about 3.0–6.0 weight percent, of the aqueous portion of the fermentation mixture. The volume ratio of alkane to aqueous medium should be between about 0.004:1 and about 1:1 preferably about 0.04:1 to about 0.2:1 Inoculum of Arthrobacter species ATCC 21237 should comprise between about 1.0 and 2.5 volumes per 100 volumes of fermentation mixture.

The micro-organism employed in our invention requires aerobic conditions for favorable growth. Air may be brought into contact with the growth medium by introducing it through a sparger located at the bottom of the fermentation vessel wherein the small bubbles will pass upward through the fermentation broth mixture. Alternately, vigorous mixing of the contents of the fermentation vessel often brings sufficient quantities of air into contact with the growth medium provided an adequate air space exists above the fermenting mixture. In large fermentation vessels, either method may prove inadequate. In these instances, both sparging and mixing may be necessary to provide proper aeration. When practicing the process of our invention with small quantities of fermenting liquid held in 1 to 3 liter flasks, sufficient aeration is normally provided by loosely stoppering the neck of the flask with cotton and placing the flask on a rotary shaker. Although the air or oxygen may satisfactorily by employed in the process of our invention, the use of oxygen provides no particular advantage and where economic considerations are important the preferred oxygen-containing gas is air.

Although the process of our invention may be practiced batchwise, continuously or combinations thereof, the growth period required for maximum production of alkanones by our process often dictates the particular process scheme to be employed. We have found that in a batch process optimum yield of alkanone is obtained after 2 to 6 days, preferably 4 days. We have also found that beyond this period of time the alkanone yield may decrease, but the relative ratios of the alkanones present do not change substantially. During the incubation period the temperature of the fermentation mixture should be maintained between 26° and 32° C., preferably between 29° and 30° C. while the pH should be maintained between 6.0 and 8.0, preferably between 7.0 and 7.8.

The following examples demonstrate the process of our invention.

EXAMPLE I

One gram of a Hagerstown silty clay loam soil was diluted in sterile water and plated on nutrient agar containing 0.1 glucose. After incubation at 29° C. for 4 days a micro-organism of the genus Arthrobacter was isolated. A pure culture of this micro-organism was maintained on a slant of nutrient agar containing 0.1 glucose and samples of it were deposited with the American Type Culture Collection in Rockville, Md. where it was assigned the number, ATCC 21237.

Inoculum for use in the oxidation reaction was prepared. Fifty milliliters of the nutrient medium of table I together with 2.5 g. of yeast extract were placed in a 300 ml. flask. After the contents of the flask were sterilized, they were inoculated with cells of strain ATCC 21237. The flask was stoppered loosely with cotton, place on a rotary shaker and incubated at 29° C. for a 2 day period.

The selective oxidation was conducted in a two liter flask to which were added 250 ml. of the aqueous medium of table I, 12.5 g. of yeast extract (Difco) and 20 ml. of hexadecane. Following sterilization of the flask and its contents, 2.5 ml. of inoculum containing Arthrobacter ATCC 21237 from the previous step were added to the fermentation mixture. The flask was placed in a reciprocal shaker and incubated at 29° C. At the end of 5 days, the hydrocarbon layer was sampled and analyzed by means of gas chromatography, mass spectroscopy and infrared analysis. These techniques showed that approximately 6 percent of the hexadecane had been converted to a mixture of monohexadecanones having the following analysis: 2-hexadecanone, 72 percent; 3-hexadecanone, 23 percent; 4-hexadecanone, 4 percent.

EXAMPLE II

In a manner similar to that of example I, pentadecane was subjected to the microbiological action of Arthrobacter ATCC 21237. Samples of the hydrocarbon layer were taken during the incubation at the end of 2 4, 48 and 72 hours. The analysis of the ketones produced is presented in table II below.

Table II

| Incubation Period: | Percentage of Alkanones | | |
| --- | --- | --- | --- |
|  | 24 hrs. | 48 hrs. | 72 hrs. |
| 2-Pentadecanone | 59.5 | 77.4 | 79.6 |
| 3-Pentadecanone | 27.9 | 16.8 | 14.3 |
| 4-Pentadecanone | 12.6 | 5.8 | 6.1 |

These examples show that Arthrobacter species ATCC 21237 will selectively oxidize alkanes at the 2,3 and 4 positions to produce monoalkanones wherein the relative ratio of alkanones in the mixture is in descending order of the carbonyl group from the terminal methyl group.

The terms and expressions used herein are used for purposes of description and illustration. There is no intention by the use of such terms and expressions of excluding any equivalents since it is recognized that various modifications and departures in the process detail shown above can be made within the scope of the invention claimed.

We claim:

1. A process of oxidizing alkanes to alkanones which comprises:
    aerobically culturing Arthrobacter species ATCC 21237 on a mixture comprising an aqueous nutrient medium, a nonhydrocarbon carbon source and a $C_{10}$–$C_{16}$ alkane under incubation conditions for a period of time sufficient to form alkanones, separating the hydrocarbons from the mixture and recovering the alkanones.

2. A process according to claim 1 wherein the alkane is hexadecane.

3. A process according to claim 1 wherein the alkane is pentadecane.

4. A process according to claim 1 wherein the nonhydrocarbon carbon source is selected from the group consisting of cornsteep liquor and yeast extract.

5. A process according to claim 1 wherein the incubation conditions comprise:
    a temperature of between 26° and 32° C., 4, 4, 4, 2, O, 3,
    a pH of between 6.0 and 8.0,
    a ratio of alkane to aqueous nutrient medium of between about 0.004:1 and about 1:1 and an incubation period of between 2 and 6 days.

6. A process according to claim 5 wherein the nonhydrocarbon carbon source is cornsteep liquor comprising 0.5 to 2 volume percent of the aqueous medium.

7. A process according to claim 5 wherein the nonhydrocarbon carbon source is yeast extract comprising 0.5 to 10 weight percent of the aqueous medium.

8. A process according to claim 1 wherein the aqueous nutrient medium contains; 0.8 g./lt. $Na_2HPO_4$, 0.8 g./lt. $KH_2PO_4$, 0.2 g./lt. $MgSO_4$, 0.002 g./lt. $CaCl_2$, 0.001 g./lt. $FeSO_4\cdot7bH_2O$, 8.0 g./lt. $NaNO_3$, plus tap water to make a liter of medium.

9. A process according to claim 1 wherein the Arthrobacter species ATCC 21237 is an inoculum grown on a nutrient medium comprising a nonhydrocarbon carbon source selected from the group consisting of cornsteep liquor, yeast extract and glucose and the ratio of inoculum to the mixture comprising said nutrient medium, said carbon source and said alkane is between about 1:100 and 2.5:100.

* * * * *